United States Patent [19]

Hanle et al.

[11] Patent Number: 5,012,511
[45] Date of Patent: Apr. 30, 1991

[54] METHOD OF AND SYSTEM FOR CONTROL OF SPECIAL SERVICES BY REMOTE ACCESS

[75] Inventors: John P. Hanle, Silver Spring, Md.; James E. Curry, Herndon, Va.

[73] Assignee: Bell Atlantic Network Services, Inc., Arlington, Va.

[21] Appl. No.: 505,386

[22] Filed: Apr. 6, 1990

[51] Int. Cl.⁵ .............................................. H04M 3/54
[52] U.S. Cl. ................................... 379/211; 379/201
[58] Field of Search ............... 379/201, 210, 211, 212, 379/243, 207, 213, 214, 244, 269; 370/62

[56] References Cited

U.S. PATENT DOCUMENTS

| | | | |
|---|---|---|---|
| 4,232,199 | 11/1980 | Boatwright et al. | 379/197 |
| 4,313,035 | 1/1982 | Jordan et al. | 379/207 |
| 4,475,009 | 10/1984 | Rais | 379/69 |
| 4,878,240 | 10/1989 | Lin et al. | 379/67 |

Primary Examiner—James L. Dwyer
Attorney, Agent, or Firm—Lowe, Price, LeBlanc, Becker & Shur

[57] ABSTRACT

Disclosed is a method and apparatus for effecting remote access to special services in telephone networks described particularly with respect to call forwarding. An adjunct computer is associated with a Remote Memory Administration System (RMAS) for switches which include a facility for providing special services such as call forwarding. The adjunct computer is inserted between the RMAS and the switches which it controls. The adjunct includes a processor responsive to subscriber identification and stored class of service information to recognize that call forwarding service is to be provided to an identified subscriber station. The processor receives requests for special service via a multiline hunt group associated with a Remote Access Directory Number (RADN) conneted to a voice response unit which feeds request signals to the processor and voice prompt to the caller. The processor determines the identity of the subscriber station which is to receive the requested service and the nature of the service and generates a programming signal and formats the signal for compatibility with the switch to which the station is connected. The processor also transmits to the switch recent change programming signals originating in the RAMS as well as the programming signals to effectuate call forwarding. Buffer memory and multiplexing capability is provided.

20 Claims, 3 Drawing Sheets

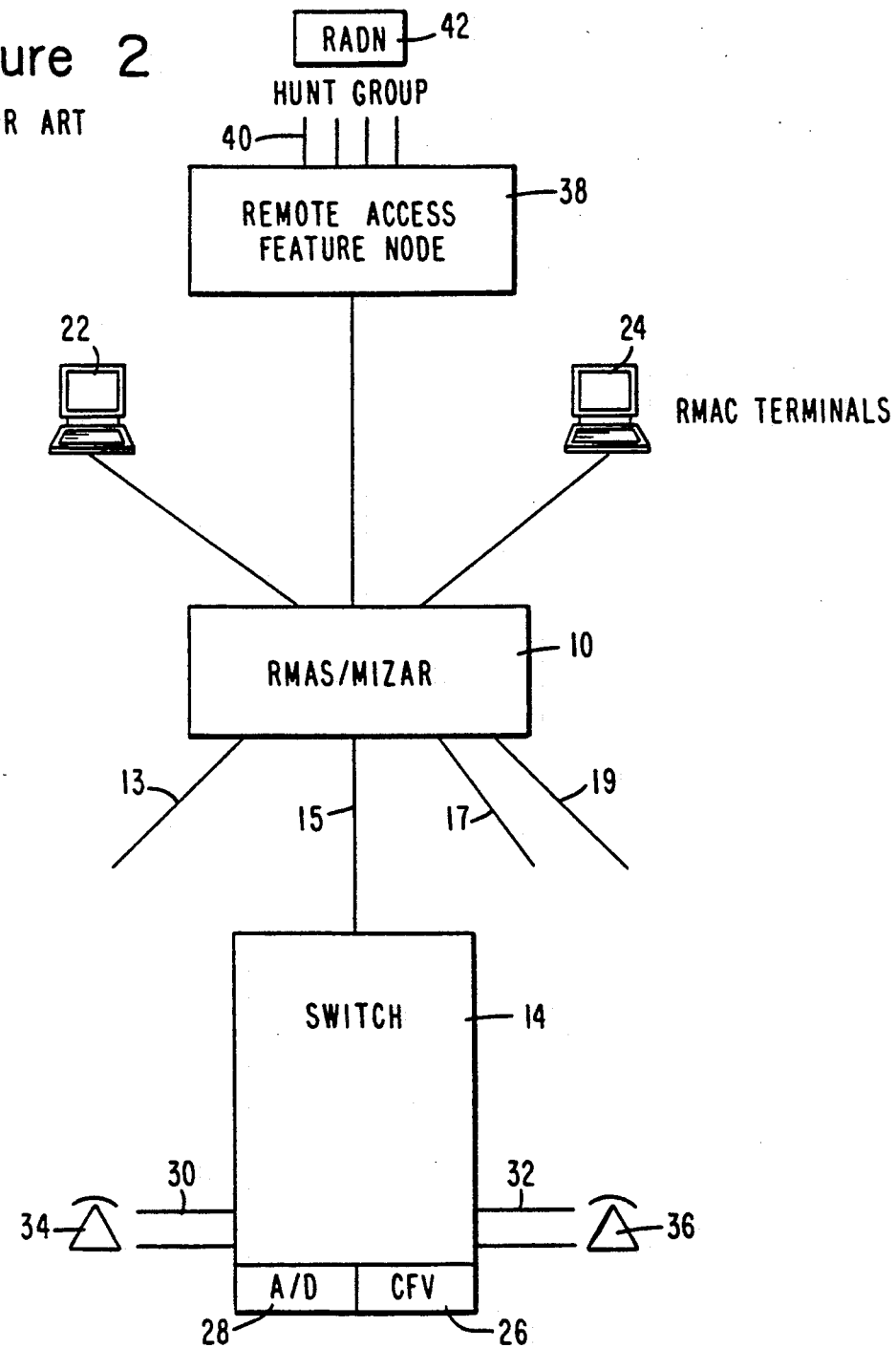

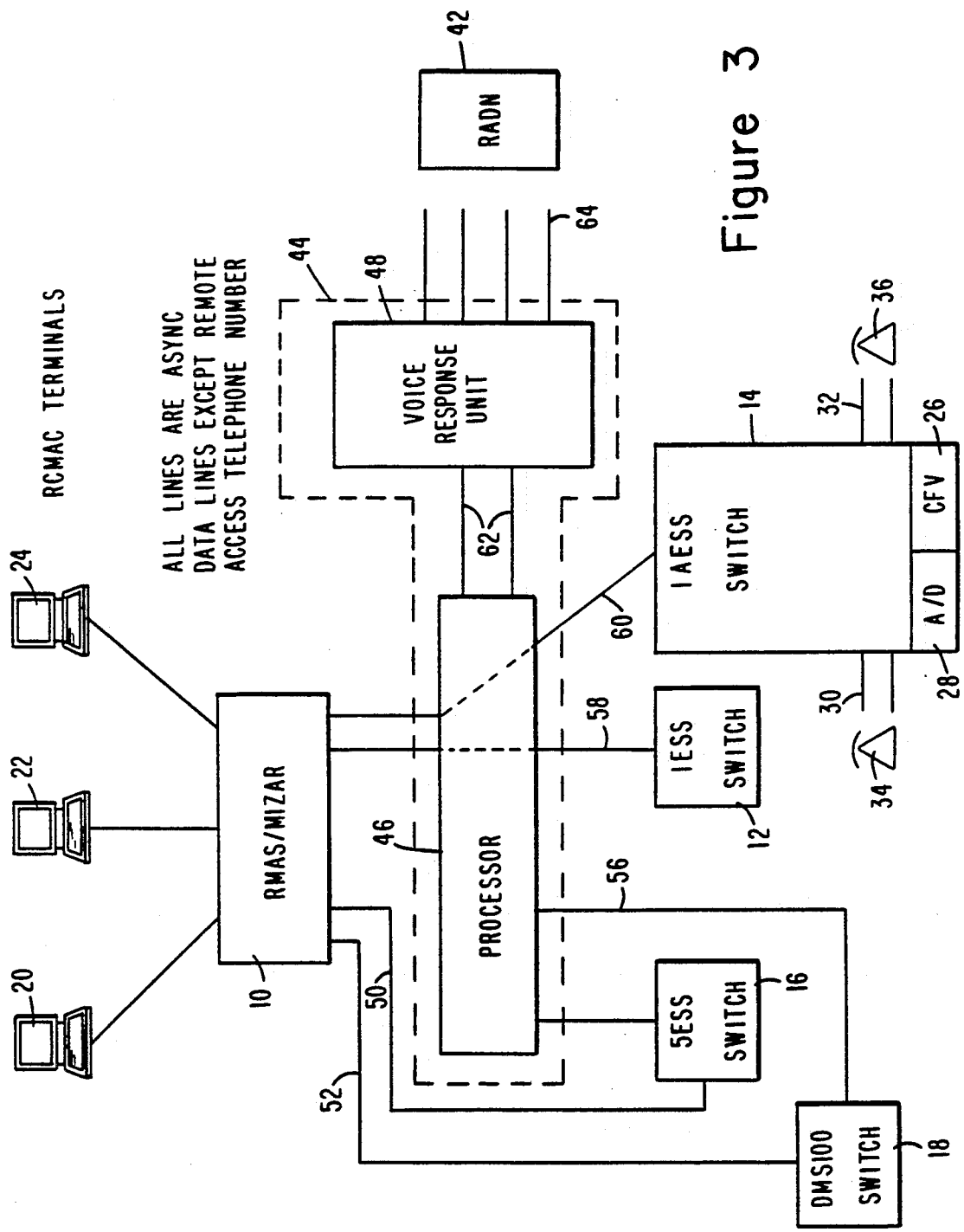

METHOD OF AND SYSTEM FOR CONTROL OF SPECIAL SERVICES BY REMOTE ACCESS

TECHNICAL FIELD

The present invention relates generally to remote access to custom calling, special or enhanced services in telephone networks and more particularly to a method and system for providing remote access to control of call forwarding service.

BACKGROUND ART

Call Forwarding, a popular custom calling or special service in telephone networks, has been offered in Stored Program Control (SPC) switching systems for many years. To activate this Call Forwarding service, subscribers have been instructed to dial an activation code followed by a local or toll telephone or directory number (DN). Thereafter, until the subscriber dials a de-activation code, the switching system forwards all of the subscriber's calls to the thus entered forwarding directory number. In effectuating this service a party served by a local SPC switch office and who subscribes to Call Forwarding service has stored in the memory at the office, data identifying the party as a subscriber. In addition data is also stored at the office indicating if the service is activated and, if so, a directory number to which incoming calls are to be forwarded. When an incoming call is received the stored program of the office directs the interrogation of the memory data associated with the called station to determine if the called party subscribes to Call Forwarding service. If not, or if the service is not activated, the call is completed to the called station in ordinary fashion. However if a Call Forwarding service is active for the called party the stored program obtains the forwarding number from memory and from that point acts effectively as an originating office with respect to the new number. That is, the office may complete the call locally to the new number if it is served by the office, or it may seize an outgoing trunk to another local office or to a toll network, as the situation demands, and outpulse the new number to a distant office to complete the call. A system of this type is illustrated in FIG. 1.

Referring to FIG. 1 there is shown a conventional local telephone network wherein a Remote Memory Administration System (RMAS) or a MIZAR computer 10 is connected to program a series of varying type Stored Program Control (SPC) switches 12, 14, 16 and 18. RMAS and MIZAR are commercial designations used to refer to computers which are adapted to respond to input signals to generate so called "Recent Change" signals to Stored Program Control (SPC) switching systems to effect changes to line and trunk translations that have not been merged with the data base. As will be understood, such switches are controlled by a switch computer whereby the specific switching functions are implemented in a series of software routines which are commonly referred to as generics. The switch computers are distinct from the RMAS or MIZAR computer. The generics are developed by the switch manufacturer and loaded into the switch for subsequent use at the local switching office. Through the generics the switch is able to provide a predefined selection of enhanced services to any local customer that is connected to the switch. The SPC switch 14 is assumed to have generics which include a Call Forwarding Variable (CFV) and an Activation/Deactivation Flag (A/D) for each so subscribed loop terminating on the switch.

The RMAS 10 is connected to the SPC switches 12-18 by Recent Change Channels 13, 15, 17 and 19. The Recent Change Channel is a general purpose I/0 port used for programming switch translation variables including the CFV and A/D. A series of technician or RCMAC terminals 20, 22 and 24 are connected to access the RMAS. As will be understood, the RMAS runs on a separate mini-computer and provides service technicians or operators with formatted CRT screens at terminals 20, 22 and 24 to enter service orders. The RMAS translates the screen inputs into proper Recent Change requests and submits them to the appropriate CO switch in an orderly fashion.

In FIG. 1 the switch 14, which is a 1AESS switch, is illustrated in detail, it being understood that the other switches possess similar features. The SPC switches provide for a Call Forwarding Variable (CFV) 26 and an Activation/De-activation Flag (A/D) 28 for each subscriber loop terminating on the switch. Two such loops 30 and 32 are shown connecting stations 34 and 36 to the switch.

For any incoming call, if the primary destination directory number (DN) A/D flag is in the activated state, the switch performs a translation on the call to route it to the forwarded destination DN contained in the associated CFV data area. With standard Call Forwarding, the CFV and A/D must be programmed either from the subscriber's primary DN or manually by a technician at the RMAS. Conventional Call Forwarding provides an access code and a series of tone prompts to guide the customer through the Call Forwarding programming sequence.

An obvious limitation of this conventional service is that the Call Forwarding subscriber must physically be at the home or office telephone location in order to activate or deactivate the call forwarding feature or to change the "Forward To" number. This requires that the customer anticipate his need for Call Forwarding before leaving the residence or business and that he return any time that he desires to make a change. Often, however, the need for access to the service occurs at some remote location.

In order to overcome this limitation it has been proposed to provide a new feature which may be referred to as Remote Access to Call Forwarding (RACF). With Remote Access to Call Forwarding a subscriber could utilize any telephone equipped with DTMF signaling capability, dial a special access number, followed by a Personal Identification Number (PIN), and then dial additional codes in order to activate or deactivate the Call Forwarding feature. It will be understood that the PIN is a security mechanism to prevent accidental or malicious interference with features and/or services on other subscribers' telephone lines.

One approach to providing such service may be generally described as follows. In many stored program control switches technicians may use the Recent Change Administration Capability to activate and deactivate Call Forwarding on individual subscribers' lines. If a computer such as a personal computer is configured to emulate a technician terminal (RCMAC terminal) accessing the Remote Memory Administration System (RMAS), users of the remote service may dial into ports on the thus configured computer and enter appropriate commands to cause the computer to emulate the technician and activate or deactivate the Call Forwarding feature on the user's line. A system of this type is illustrated in FIG. 2.

Referring to FIG. 2 the same reference numerals are used as in describing the conventional or standard call forwarding illustrated in FIG. 1. In the FIG. 2 arrangement appropriate hardware in the form of a Remote Access Features Node (RAFN) 38 is interfaced between the RMAS 10 and a hunt group 40 associated with a Remote Access Directory Number (RADN) 42. With this configuration call forwarding requests can be collected from customers via the hunt group, processed in the RAFN and RMAS and issued to the CO switch 14.

With this arrangement the telephone answering service interface will detect when the customer dials the RADN and inform the RAFN or processor 38 of the event. The processor (which may contain a voice response unit) will direct appropriate voice messages to the customer to obtain the information required to perform the customer's call forwarding request. All input by the customer will be in the form of DTMF digits which will be received by the answering service interface and passed to the processor. When all required information has been collected from the customer, the processor will assemble the forwarding request and transmit it to the RMAS for execution. Additionally should a technician terminal be connected to the switching office destined for the CFV change, the RAFN must wait for completion prior to execution of the change.

However, while this architecture is capable of effecting remote access to Call Forwarding it presents a number of problems. The principal of these problems is delay. After the user dials into the computer it requires an excessive time to activate the feature because commands generated by the computer must be queued with all of the other memory administration work activity, not necessarily destined for the CFV subscriber's office, generated by technician terminals connected to the RMAS.

Another obstacle to implementation of RACF service is the presence and current use of multiple types of switches in most existing telephone networks. One example of a switch by switch approach to this problem is illustrated in U.S. Pat. No. 4,232,199 to Boatwright et al, issued Nov. 4, 1980. This patent describes a special service add-on for a central office which uses a dial pulse activated switch. The main thrust of the patent is the development of a central office add-on device which will permit special services to be offered from offices using step-by-step switching. The add-on unit which is specifically described includes Call Forwarding as well as a number of other special or enhanced services. The Call Forwarding service may be controlled by the subscriber from his own subscriber telephone or any other telephone equipped with DTMF dialing. Such remote programming is performed by dialing a directory number assigned to a remote programming port in the add-on unit to enable the subscriber to access the add-on in a remote programming mode.

Another approach to providing Remote Access to Call Forwarding which has been deployed in the U.K. is to place a Modular Services Node (MSN) between the customer's loop and the CO switch. The MSN consists of a digital switch, a voice announcement system and a controlling processor. It can service several hundred subscriber loops. With this arrangement the answering service interface of the MSN can handle the remote call from the customer with voice guidance. It can prompt the caller for his primary destination DN, his PIN, his desire to activate or de-activate and his forwarded destination DN. It would then program the CO switch by emulating his primary station. The principal weakness of this design is that hardware is dedicated to each customer loop requiring extremely large amounts of hardware to service a significant number of subscribers, which imposes a high cost. A second weakness is the need to hard wire customers desiring the change capability, thereby making the offering more labor intensive.

Yet another approach to handling varying types of switches is described in U.S. Pat. No. 4,878,240 to Lin et al, issued Oct. 31, 1989. The Lin et al patent discloses an arrangement which provides an adjunct switch unit for each involved central office switch. The Lin et al arrangement provides each subscriber with two telephone numbers. One number is the published number which is known to the central office switch and is the number that the public would dial to reach the subscriber. The other number is known only to an adjunct which is provided for the switch. Incoming calls to the subscriber's published number are routed by the central office switch (as through a call forwarding feature) to the adjunct where it is then routed through an additional programmable switch for the duration of the call. Based upon the services subscribed to by the called party and based upon the condition of his telephone line (i.e., answered, busy or not answered), the call is routed to the other adjunct known number of the called party. The adjunct then causes the ringing of the subscriber's telephone, or if call forwarding is activated, to ring the published number of the forwarding party in order to ring the telephone there. This arrangement involves a significant investment in sophisticated adjunct equipment and a basic change in the way switching is handled in a central office switching system.

Still another approach to RACF is the use of customer premise equipment (CPE). However, a CPE version requires multiple calls by the user. The first call initiates a timing sequence in the CPE which enables a follow-up call, if made within the prespecified timing sequence, to deactivate the present forwarding condition. A subsequent call will allow for remote activation of the CFV feature. An apparatus for effecting CPE type control is illustrated in U.S. Pat. No. 4,475,009 to Rais, issued Oct. 2, 1984. As with all CPE equipment the apparatus described in the Rais patent is effective for remotely controlling Call Forwarding for the particular line to which it is connected.

SUMMARY OF THE INVENTION

It is accordingly an object of the present invention to provide a new type of network adjunct node arranged to provide an apparatus and method for remote access to special services or features of a telephone network on a high speed basis.

It is another object of the invention to provide an apparatus and system for providing remote access to control of call forwarding utilizing existing local telephone network equipment and procedures in conjunction with a new adjunct node interacting with the pre-existing equipment and procedures.

It is another object of the invention to provide effective remote access to Call Forwarding service using equipment that is shared by a large universe of subscribers and hence is low in cost and easily implemented.

It is another object of the invention to provide an improved Remote Access to Call Forwarding service in a multiple switch telephone network having an RMAS/MIZAR which may be implemented by adjunct equipment associated with the RMAS/MIZAR.

It is another object of the invention to provide an improved Remote Access Call Forwarding service which may be implemented from centralized nodes assuring that human interface to the service is uniform across multiple types of switching systems.

It is still another object of the invention to provide a platform for implementing Remote Access to Call Forwarding which may also provide additional special services.

It is yet another object of the invention to provide an improved Remote Access to Call Forwarding service and apparatus which provides improved security.

The above and other objects of the invention are satisfied, at least in part, by providing, at a central office serving subscriber lines an adjunct computer system inserted between the RMAS/MIZAR and the input channel to the switching system, rather than having the computer system emulate the terminal behind the RMAS/MIZAR system. When reference is made hereinafter to a RMAS system it is to be understood that the RMAS and MIZAR systems are functional equivalents and that reference to one includes reference to the other and/or functional equivalents thereof. The adjunct computer is programmed to intercept and buffer messages from the RMAS system to the switch. This provides the ability to insert high priority messages into the normal traffic stream. Thus the short message resulting from a subscriber request to activate or deactivate Call Forwarding may be inserted into the Recent Change Channel traffic stream almost immediately, rather than waiting in queue in the RMAS system itself along with the other technician RCMAC terminal traffic. The brevity and relative infrequency of these subscriber messages allows them to be inserted into the traffic stream with virtually no discernible impact on the response time as perceived by the technicians attached to the RMAS system.

Thus it is an object of the invention to provide in a telecommunications system having a plurality of switching means interconnected by trunks, a plurality of subscriber stations arranged in groups with each group being served by one of the switching means, a plurality of subscriber lines connecting each switching means with the group of subscriber stations served thereby, a switching network in each switching means for establishing communication paths between calling subscriber stations and called subscriber stations addressed by the calling stations, with at least one of the switching means including means for providing special services to subscriber stations which it serves, a Remote Memory Administration System (RMAS) associated with the switching means for programming switch translation variables, and technician terminals connected to the RMAS for entering programming orders, the improvement comprising adjunct means associated with the RMAS and connected to at least one of the switching means which is adapted to provide special services to subscriber stations which it serves, a multi-line hunt group associated with a Remote Access Directory Number (RADN), where the adjunct means includes voice response means connected to the multiline hunt group, and processor means which is responsive to subscriber identification and stored class of service information for recognizing that a special service is to be provided to a subscriber station connected to one of the switch means, and which processor is capable of generating a signal for programming the switch means so as to effect the modification necessary to provide the special service to that subscriber station, and wherein the processor means is connected between the RMAS and at least one of the switch means for transmitting to the switch means signals from the RMAS for programming switch translation variables originated by the technician terminals connected to the RMAS.

It is yet another object of the invention to provide a method for remotely programming switch means in a telecommunications system having a Remote Memory Administration System (RMAS) for programming switch translation variables comprising the steps of detecting at a node between the switch means and RMAS the receipt of a remotely transmitted signal requesting special service programming of the switch, storing at least a portion of the request signal at the node, detecting at the node the receipt of recent change programming signals from the RMAS, storing at least a portion of the recent change programming signals at the node, and transmitting from the node to the switch means multiplexed programming signals for effecting recent change programming and special service programming of the switch means.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modification in various other respects, all without departing from the invention. Accordingly, the drawing and description are to be regarded as illustrative in nature, and not as restrictive.

BRIEF DESCRIPTION OF DRAWINGS

FIG. 2 is a diagram showing a prior art proposal for providing remote access to control of call forwarding; and FIG. 3 is a diagram showing a Remote Access to Call Forwarding system constructed in accordance with the preferred embodiment of the invention.

DETAILED DESCRIPTION

Figure 1:
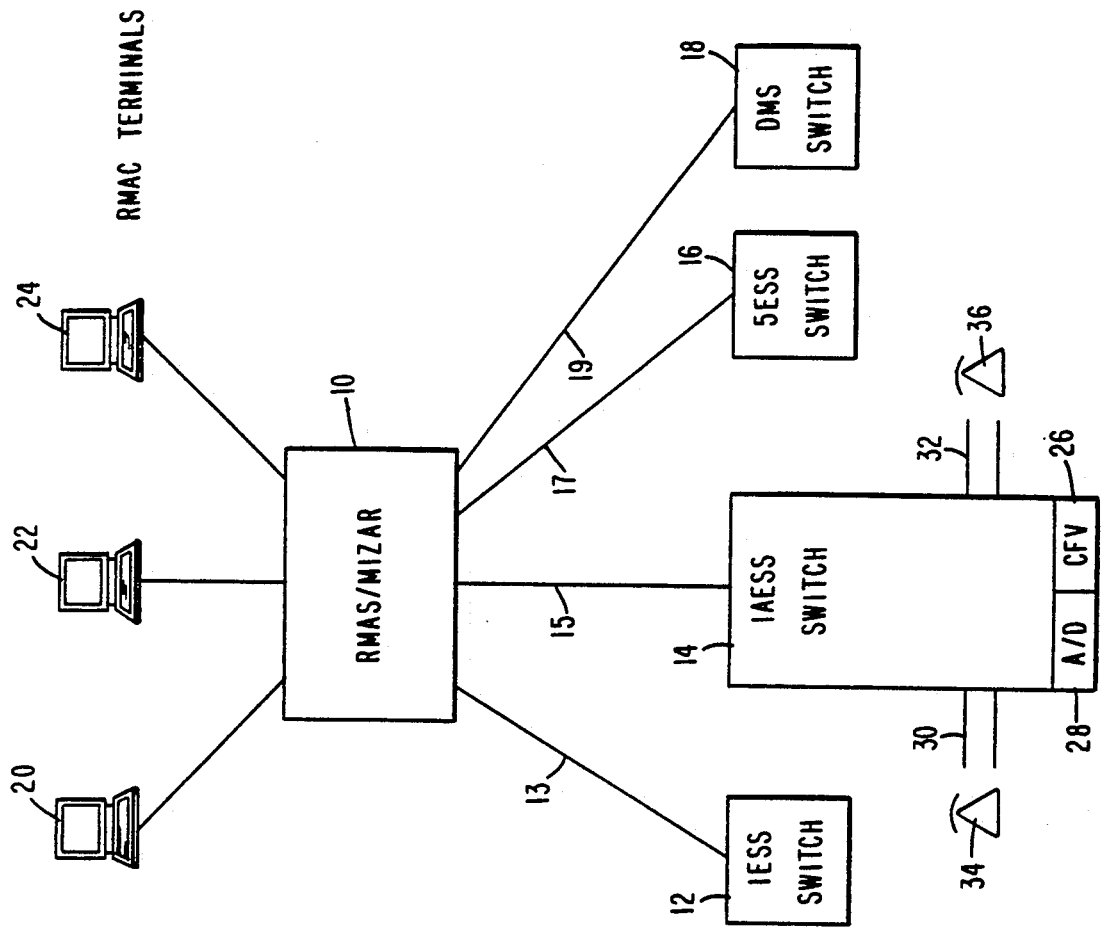
FIG. 1 is a diagram showing a conventional local telephone network with a Remote Memory Administration System (RMAS) connected to technician or RCMAC terminals and various switches which it controls.

Referring to FIG. 3 there is shown a preferred embodiment of the invention wherein remote access is utilized to accomplish call forwarding. In FIG. 3 the 1AESS switch bears the same reference numerals as in FIGS. 1 and 2 and is similarly disposed with respect to the subscriber stations connected thereto, such as stations 34 and 36. It will be understood that while only switch 14 is illustrated as connected to subscriber stations the other switches 12, 16 and 18 may be similarly connected and portrayed.

RCMAC clerks or technicians input recent change or service orders into the RMAS computer 10 via RCMAC terminals 20, 22 and 24. As will be understood, this computer may provide multiple terminal access to 5ESS and DMS switches, single terminal access to multiple switches in multiple offices, storage of orders for timed relief to the central office on the date due, formatted entry of orders and tracking of order completion. Most service orders are released to the central offices between midnight and 8 a.m. according to a schedule maintained by the system administrator.

The RMAS computer 10 has an asynchronous data line to each central office to which it provides access. These are shown as the lines 50, 52, 58 and 60. However, while RMAS uses asynchronous links the system of the invention is equally applicable to synchronous and other types of links. The computer reformats the service order entries from the technicians into the recent change format appropriate to the central office type being accessed (1ESS, 1AESS, 5ESS, etc.). The computer then releases the recent change to the office and monitors the channel for the appropriate responses (order accepted, retry later, order rejected, etc.). The computer also runs a timer on the central office responses. If a response takes too long the computer will send the same recent change message again up to a predetermined number of times. While FIG. 3 illustrates four different switches representing four central offices it will be understood that an RMAS system and the associated Recent Change Memory Administration center may typically handle approximately 80 central offices dependent on computer size and transaction processing capability.

According to the invention the system is provided with a call forwarding adjunct 44 which is connected to the RMAS 10 and the switches 12, 14, 16 and 18. The adjunct 44 includes a fault tolerant computer processor 46 and a Voice Response Unit (VRU) 48. By way of example the fault tolerant computer may be a Sequoia Model 200, a 68020 based computer, and the VRU may be a Periphonics Voice Response Unit. This unit provides digitized recorded voice. A voice synthesizer may alternately be used but with some loss of quality and hence acceptance by the customer. The VRU is connected to a multiline hunt group 64 associated with a Remote Access Directory Number (RADN). The RADN may constitute a 7 digit number but preferably is a free call (800) number. This will allow customers to dial a toll free number when they are outside their local area. Also, since 800 service is provided by the Intelligent Network it is possible to change the location of the RACF platform nodes or add additional nodes without having to change the access number that the customer dials. An 800 number also provides the capability to offer a single number to access the service nationwide.

The 5ESS and DMS100 switches 16 and 18 retain their private data links 50 and 52 to the RMAS. However they are also connected by separate links 54 and 56 to the processor 46. The 1ESS and 1AESS switches 12 and 14 each have only one available recent change link 58 and 60 and the processor 46 must share access to that link. The links 58 and 60 are thus shown as symbolically proceeding through the processor. The RACF adjunct 44 is inserted between the RMAS 10 and the input channel to those switching systems served by the RMAS which have only one available recent change link, such as 1ESS and 1AESS offices. Those offices which possess more than one available recent change link, such as 5ESS and DMS100 offices, retain a private data link to the RMAS and are also provided with a separate link to the processor 46. This permits the RACF service to be implemented in all Stored Program Control switches with only one set of printed instructions for using the service.

The connection of the 1ESS and 1AESS switches to the RMAS through the processor creates a contention situation which is handled by buffer memory and software in the processor. Thus when no requests are pending in the adjunct 44 for a particular central office or switch, the processor 46 acts as a "dumb pipe". That is, the RMAS and central office messages flow through the processor 46 without modification and minimal delay. However, if a call forwarding recent change message is formatted and ready for release to the central office or switch, the following occurs: If a RMAS message is in progress (moving through the adjunct) it is allowed to continue and the response from the central office is allowed to pass also. However, the next message from the RMAS is buffered (stored) in the processor. The call forwarding message is then released to the central office or switch and the central office response is collected. Then the buffered RMAS message is released to the central office or switch and the response returned. The call forwarding messages are completed and the RMAS obtains its response from the central office or switch before it times out. As a result the adjunct appears to be transparent to the RMAS system even though there may actually be a delay of multiple seconds. In effect there is a multiplexing action of the call forwarding recent change formatted messages or signals and the RMAS recent change messages or signals.

The Voice Response Unit (VRU) 48 performs the following:

Detects and answers incoming calls to the Remote Access Directory Number (RADN).

Plays voice prompts to the caller—for home/office DN, PIN, feature code, etc.

Collects DTMF digit or voice responses from the caller.

Communicates with the processor 46 over the host links 62.

Communicates with the multiline hunt group 64.

The system operates as follows: The RACF processor 46 receives the call forwarding request and associated information from the hunt group 64 via the Voice Response Unit 48. It verifies the validity of the request and the PIN and instructs the VRU to play any necessary prompts or error messages. If the request is valid the processor formats a recent change message appropriate to the type of request and type of switch (determined by the customer's telephone number and adjunct data base). It then sends this message to the central office or switch and instructs the VRU to inform the customer of the success or failure of the request.

It will be understood that the processor may be provided with the usual support system interfaces to work with the existing operational support systems used to maintain central office switching equipment. These may comprise asynchronous or synchronous data access lines into the processor for maintenance, statistics, trouble location and provisioning.

The procedure for using RACF begins when the user dials a Remote Access Directory Number (RADN) which is assigned to and terminates at the RACF adjunct 44 at the multiline hunt group 64. The user is thus connected to the adjunct through the RADN line. While the user will normally dial the RADN from a remote station there are no restrictions to prevent the user from dialing the RADN from the target DN. The RADN line is connected to the Voice Response Unit 48 which provides a prompt such as: "This is your Remote Access service. You may now dial your home or office telephone number that has Remote Access service. Please dial now."

The user then dials his/her 7-10 digit home/office number. The dialed digits are collected at the processor 46 until 7-10 are received. A prompt of the following type is next played: "The number you have dialed is xxx-xxxx. If this is correct dial your Personal Identification Number." The user dials a multiple digit PIN number. After these digits are collected and stored a data base search is performed in the adjunct for the combined DN and PIN for validation purposes.

Assuming a valid number has been received a prompt of the following type is played: "To activate Call Forwarding dial 72#. To de-activate Call Forwarding dial 73#. Please dial now." It will be understood that other codes and prompts could of course be used.

Assuming the dialer dials 72# to attempt to activate Call Forwarding, and also assuming that Call Forwarding has not previously been activated, a prompt of the following type is played: "You have accessed the Call Forward activation feature. To confirm this feature dial (1). To try a different feature dial (0) and another code. Please dial now." Assuming the user dialed (1) to confirm, the activation sequence is started and a prompt of the following type is played: "This is your Call Forwarding service. Please dial the number to which you want your calls forwarded."

The user dials the Forward To Number (FTN). The adjunct stores and replays the dialed digits and requests the user to dial "1" if the number is correct or "0" followed by a new number. If the user confirms the FTN a prompt of the following type is played: "Your request is being processed. Please hold." The adjunct processor 46 now formats and initiates an appropriate message to the affected switch which will thereafter attempt to forward calls made to the specified DN. Assuming that prior activation did not exist and that activation was successful, a prompt of the following type will be played: "Your calls will now be forwarded. You may hang up or dial another feature code now." It will be understood that two types of user prompts are provided by the system: interruptible and non-interruptible. Interruptible prompts are normal user prompts requesting information to complete normal service changes. Non-interruptible prompts are provided upon user input errors to force listening to error prompts.

All communication to and from the user in the foregoing steps has been through the RADN line.

It will be apparent from the foregoing that the invention provides an improved system and method for remote access to control of special services on a high speed basis. The system and method is implemented from a centralized node or nodes assuring that human interface to the service is uniform across all types of switching systems. Such uniformity is important in a mass market service of the telephone type where instructions for use are customarily printed in the front pages of the telephone directory and where advertising is widespread in television and print media. Since the new adjunct platform itself is the user agent that provides the human interface, and the software in the platform can be adapted to the differences in maintenance channel protocols of the various switching system types, users may be assured of a uniform interface even as switching systems are changed.

Further, once the platform is in place there are additional services which may be implemented by additional software codes. Such services may include automatic time of day changes to call forwarding patterns, a "vacation" service that would allow users to deactivate their telephones during periods of extended absence, and many others. This centralized node approach permits improved security as compared to security provided within the switch software. Switching software provides a fixed number of digits for the personal identification number that a customer enters when accessing the system. On the other hand the present invention permits varying the number of digits. The system also permits limiting access to the data base of security numbers, giving this permission to the system administrator only by way of example.

The standalone centralized node approach also provides the ability to quickly modify, delete and add to the voice prompts and other service attributes. Thus when service scripts need to be changed such change may be effected within hours or days rather than having to wait for switch vendor development schedules, sometimes taking years for change of switching equipment software. The centralized node approach also permits the new service to be presented in a large area quickly. All of the installation is accomplished in one centralized location where the platform is installed and tied into the existing links to every switching system in the area. Once this physical work is done, the service can be introduced simultaneously to all of the switching systems in the area rather than having to deal with every switch. It is additionally possible to add new service software and to modify the operation of the feature by implementing new code in one central computer rather than in every switch. While the preferred embodiment of the invention has been described in terms of remote access to control of call forwarding it will be understood that this has been by way of illustration only and is not intended to be restrictive.

Still other advantages of the present invention will be apparent to those skilled in the art from the foregoing detailed description, wherein only the preferred embodiment of the invention is shown and described, simply by way of illustration of the best mode contemplated of carrying out the invention. As will be realized, the invention is capable of other and different embodiments remotely controlling other and different special services without departing from the invention. Accordingly the drawing and description are to be regarded as illustrative and not restrictive in nature.

We claim:

1. In a telecommunications system having a plurality of switching means interconnected by trunks, a plurality of subscriber stations arranged in groups with each group being served by one of said switching means, a plurality of subscriber lines connecting each switching means with the group of subscriber stations served thereby, a switching network in each switching means for establishing communication paths between calling subscriber stations and called subscriber stations addressed by the calling stations, at least one of said switching means including means for providing special services to subscriber stations served thereby, computer means associated with said switching means and adapted to respond to input signals to generate recent change signals to program switch translation variables in said switching means, and terminals connected to said computer means for entering programming orders, the improvement comprising:

adjunct means associated with said computer means and connected to at least one of said switching means which includes means for providing special services to subscriber stations served thereby;

a multiline hunt group associated with a Remote Access Directory Number (RADN);

said adjunct means including:

voice response means connected to said multiline hunt group; and processor means responsive to subscriber identification and stored class of service information (a) for recognizing that a special service is to be provided to a subscriber station connected to one of said switch means including means for providing special services to subscriber stations served thereby, and (b) for generating a signal for programming said switch means in the circuit to said subscriber station so as to effect the modification necessary to provide the special service to that subscriber station; and said processor means being connected between said computer means and at least one of said switch means for transmitting to said switch means signals from said computer means for programming switch translation variables originated by said terminals connected to said computer means.

2. A telecommunications system according to claim 1 wherein said switch means connected to said processor means receives from said processor means first switch translation programming signals responsive to signals from said computer means to said processor means, and second switch translation programming signals from said processor means responsive to commands from said multiline hunt group.

3. A telecommunications system according to claim 2 including means associated with said processor means for multiplexing said first and second switch translation programming signals.

4. A telecommunications system according to claim 1 wherein said computer means is connected to multiple switching means which include means for providing special services to subscriber stations served thereby, at least one of said switching means being of a different type than one other of said switching means, said processor means including means to format said generated signals for compatibility with said switch means of different types.

5. A telecommunications system according to claim 4 wherein at least one of said special services includes call forwarding.

6. A telecommunications system according to claim 5 wherein the formatting of said signals is in accord with the particular switch identified by the directory number of the subscriber station to which the special service is to be provided.

7. A telecommunications system according to claim 1 wherein said processor means is connected to a second switch means having a direct connection to said computer means.

8. A telecommunications system according to claim 7 wherein said second switch means receives first switch translation programming signals from said computer means and second switch translation programming signals from said processor means responsive to commands from said multiline hunt group.

9. A method for remotely programming switch means in a telecommunications system having a computer means associated with said switch means and adapted to respond to input signals to generate recent change signals to program switch translation variables in said switch means thereof comprising the steps of:

detecting at a node between said switch means and said computer means the receipt of a remotely transmitted signal requesting special service programming of said switch means;

storing at least a portion of said request signal at said node;

detecting at said node the receipt of recent change programming signals from said computer means;

storing at least a portion of said recent change programming signals at said node;

transmitting from said node to said switch means multiplexed programming signals for effecting recent change programming and special service programming of said switch means.

10. A method according to claim 9 wherein the switch means includes multiple switch means including switch means of differing types, including the steps of:

detecting at said node a remotely transmitted signal identifying the switch means for which a request signal is intended;

storing at least a portion of said identifying signal; and formatting said signals transmitted from said node for compatibility with the differing switch means to which they are directed.

11. A method according to claim 10 including the step of transmitting from said computer means to at least one of said switch means signals to effect recent change programming of said one switch means.

12. A method according to claim 10 wherein said special service is call forwarding and the identifying signal comprises at least a portion of the directory number of the telephone station to which said call forwarding service is to be provided.

13. A method for remotely programming switch means in a telecommunications system having multiple switch means and a computer means associated with said switch means and adapted to respond to input signals to generate recent change signals to program switch translation variables in said switch means comprising the steps of:

detecting at a node connected between said switch means and said computer means the receipt of a remotely transmitted signal requesting special service programming of at least one of said switch means;

storing at least a portion of said request signal at said node;

formatting said stored request signal into recent change programming format and storing said formatted signal ready for release;

detecting at said node the receipt of recent change programming signals for at least one of said switch means from said computer means;

storing at least a portion of said recent change programming signals at said node;

sequentially transmitting said stored programming signals from said node to said switch means to effect recent change programming and special service programming of said switch means.

14. A method according to claim 13 including the steps of:

detecting at said node a remotely transmitted signal identifying the switch means in said multiple switch means for which a special service request signal is intended;

storing said identifying signal; and effecting said formatting responsive to the identity of the switch means for which the special service request signal is intended.

15. A method according to claim 13 including the step of:

transmitting a recent change programming signal from said computer means directly through said node to one of said switch means in the absence of a special service request signal in said node.

16. A method according to claim 13 wherein said special service is call forwarding.

17. A method for remotely and selectively programming multiple switch means in a telecommunications system having a computer means associated with said switch means and adapted to respond to input signals to generate recent change signals to program switch translation variables in said switch means comprising the steps of:

detecting at a node connected between said switch means and said computer means the receipt of a remotely transmitted signal requesting call forwarding programming of one of said switch means;

storing at least a portion of said request signal at said node;

identifying at said node the switch means and subscriber station for which said request is intended;

determining at said node that said subscriber's station is entitled to the requested call forwarding;

formatting said stored call forwarding request signal into recent change programming format corresponding to the identified switch means and storing said formatted signal at said node ready for release;

detecting at said node the receipt from said computer means of a recent change programming signal for one of said switch means;

storing at least a portion of said recent change programming signal at said node;

sequentially transmitting said stored programming signals from said node to said switch means to effect recent change programming and call forwarding programming of the identified switch means.

18. A method according to claim 17 including the step of:

detecting at said node the receipt from said computer means of a recent change programming signal following said transmission from said node of said signals and, in the absence of a special service request signal in said node, transmitting said last mentioned signal from said computer means directly through said node to one of said switch means.

19. In a telecommunications system having a plurality of switching means interconnected by trunks, a plurality of subscriber stations arranged in groups with each group being served by one of said switching means, a plurality of subscriber lines connecting each switching means with the group of subscriber stations served thereby, a switching network in each switching means for establishing communication paths between calling subscriber stations addressed by the calling stations, at least one of said switching means including means for providing call forwarding services to a class of subscriber stations served thereby, computer means associated with said switching means and adapted to respond to input signals to generate recent change signals to program switch translation variables in said switching means, and terminals connected to said computer means for entering programming orders, the improvement comprising:

adjunct means associated with said computer means and connected to at least one of said switching means which includes means for providing call forwarding services to a class of subscriber stations served by that switching means;

a multiline hunt group associated with a Remote Access Directory Number (RADN);

said adjunct means including:

voice response means connected to said multiline hunt group; and processor means responsive to subscriber identification and stored class of service information (a) for recognizing that call forwarding service is to be provided to a subscriber station connected to said switch means including means for providing call forwarding services to subscriber stations served thereby, and (b) for generating a signal for programming said switch means so as to effect the modification necessary to provide a requested call forwarding service to a subscriber station connected to said switch means and in the class entitled to call forwarding services;

said processor means being connected between said computer means and said last mentioned switch means for transmitting to said switch means signals from said computer means for programming switch translation variables originated by said terminals connected to said computer means.

20. A telecommunications system according to claim 19 wherein said computer means is connected to multiple switching means which include means for providing call forwarding services to subscriber stations served thereby, at least one of said switching means being of a different type than one other of said switching means, said processor means including means to format said generated signals for compatibility with said switch means of different types.

* * * * *